United States Patent [19]

Hunziker, Jr.

[11] 4,343,262

[45] Aug. 10, 1982

[54] LABORATORY RAT FEEDER

[75] Inventor: John Hunziker, Jr., Pine Bluff, Ark.

[73] Assignee: The United States of America as represented by the Secretary of the Department of Health and Human Services, Washington, D.C.

[21] Appl. No.: 247,713

[22] Filed: Mar. 26, 1981

[51] Int. Cl.³ .............................................. A01K 5/00
[52] U.S. Cl. .................................. 119/18; 119/52 R
[58] Field of Search ................................ 119/52 R, 18

[56] References Cited

U.S. PATENT DOCUMENTS

| 1,836,488 | 12/1931 | Munson | 119/52 R |
| 3,902,459 | 9/1975 | Hunziker, Jr. | 119/52 R |
| 3,965,868 | 6/1976 | Hunziker, Jr. | 119/52 R |

OTHER PUBLICATIONS

John Hunziker, "A New Feeder System for Quantitating Actual Toxicant Consumption by Mice During Feeding Studies", Feb. 1975, pp. 84–87, Laboratory Animal Science, vol. 25, No. 1.

Primary Examiner—Hugh R. Chamblee
Attorney, Agent, or Firm—Browdy and Neimark

[57] ABSTRACT

A feeding device and feed storage hopper for laboratory rats, adapted to be hung from the top and inside the animal cage, comprises a substantially rectangular feed chamber containing an open top and a downwardly sloped back panel. A generally U-shaped "floating" wire screen overlies a rectangular opening in the lower front face of the rectangular feed box and is rigidly attached to the feed box to cover the opening therein except along the bottom edge of the screen. Feed which is to be ingested by the rat rests on the face of the wire mesh screen which has been designed in a manner that the weight of the feed is forced to collapse onto the screen surface as the animal consumes the feed, thus providing a continual flow and availability of feed to the rat. The screen openings are rectangular and are longer in the vertical direction to permit the use of commercially available autoclavable mash feeds and to allow the rat to contact the feed either by inserting his tongue through the screen openings or by slightly moving and flexing the lower unattached edge of the "floating screen" structure. The screened feeder is designed to restrict the entry of the rat into the feeder and thus prevent both contamination of the feed through feces or urine or uneconomical spillage of the feed which, in either case, could distort research results. The bottom surface of the screen is substantially horizontal and allows for the collection of feed spillage.

7 Claims, 7 Drawing Figures

AVERAGE WEEKLY BODY WEIGHTS OF
FISCHER 344 FEMALE RATS FED
MEAL WITH FEEDER OR PELLETS

AVERAGE BIWEEKLY BODY WEIGHTS OF
FISCHER 344 MALE RATS FED
MEAL WITH FEEDER OR PELLETS

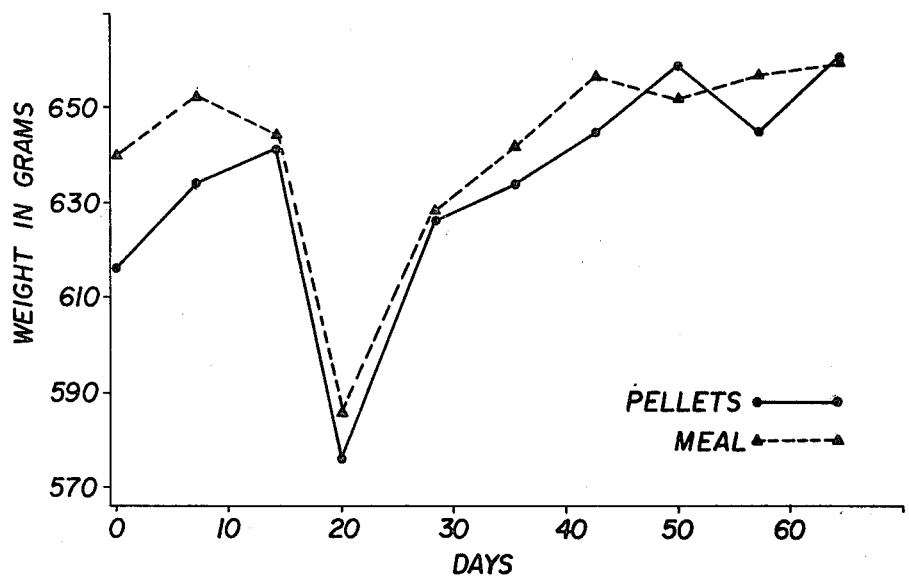
FIG. 6 AVERAGE WEEKLY BODY WEIGHTS OF ADULT CD MALE RATS FED MEAL WITH FEEDER OR PELLETS
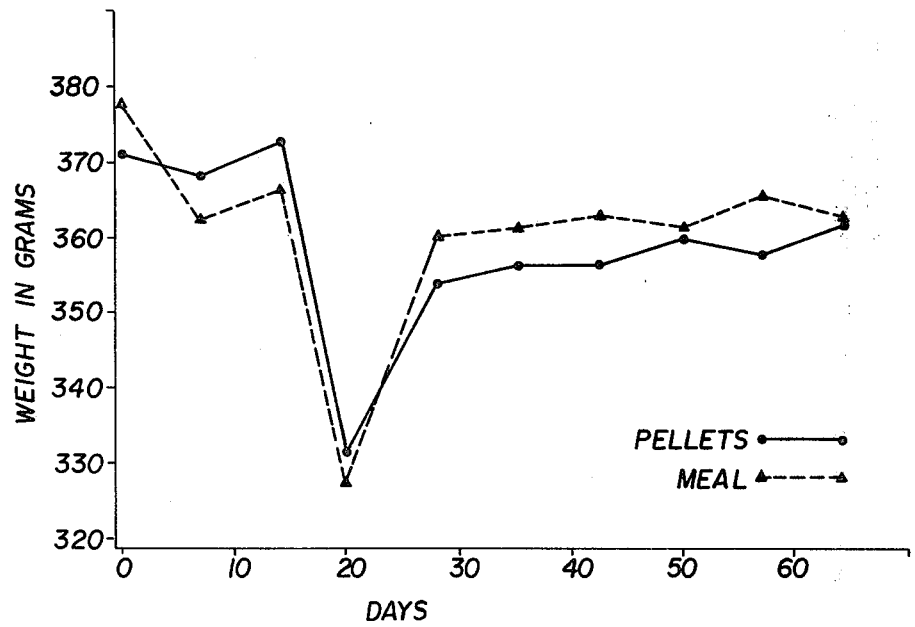
FIG. 7 AVERAGE WEEKLY BODY WEIGHTS OF ADULT CD FEMALE RATS FED MEAL WITH FEEDER OR PELLETS

LABORATORY RAT FEEDER

CROSS-REFERENCE TO RELATED APPLICATIONS

The subject matter contained in the instant application is related to that disclosed and claimed in my prior applications Ser. No. 464,489 entitled "Mouse Feeding System", now U.S. Pat. No. 3,902,459 and Ser. No. 567,718 entitled "Laboratory Mouse Feeder", now U.S. Pat. No. 3,965,868.

BACKGROUND OF THE INVENTION

The present invention relates to a feeding device and feed storage hopper for laboratory rats which device is used for experimental purposes, and more particularly to such device which restricts bodily entry of the rats into the feeder device.

Experimental rats are used in various studies of diseases, and effects of experimental diets, drugs and other treatments designed to acquire statistical knowledge for the benefit of mankind. It is highly desirable in evaluating the effects of drugs, diet and the like, to eliminate the possibility of errors, and thus misleading results, caused by the excretion of bodily wastes, such as urine and feces, into the food contained in the rat feeder device.

Moreover, current trends in toxicology and safety evaluation concerning modern drugs and medical preparations have necessitated an increase in long-term feeding studies of laboratory animals undergoing tests and observations. In order to provide valid and reliable results relating to food consumption, it has been found that long-term feeding experiments must be conducted under extremely careful feeding conditions.

It is, therefore, extremely important to avoid or prevent food contamination that will occur if the animal is permitted bodily access to food which may then be exposed to animal excretory wastes. In many instances, an animal, such as a rat, may obtain an overdose of drug fed to it by eating food contaminated by fecal matter or urine carrying some percentage of the original drug dosage, thereby inducing false test results and inaccurate observations and calculations. Furthermore, in longterm feeding studies, it is essential to determine exact food and thus drug consumption without losses due to food spillage, while maintaining conditions of utmost cleanliness.

Rat feeding studies in nutritional and toxicological research often require that the test agent be administered in the feed and that the feed and test agent consumption be quantitated. Meal rat feed is the logical choice in many studies of this type.

Feeder systems for computing feed consumption have been developed for use with laboratory mice; Hunziker, J.: A new feeder system for quantitating actual toxicant consumption by feed during feeding studies, Lab. Animal Science, Vol. 25, pp. 85-87, 1975. For example, U.S. Pat. Nos. 3,902,459 and 3,965,868 to Hunziker each show laboratory mouse feeder assemblies including a screen-covered feed container. In Hunziker U.S. Pat. No. 3,965,868 the feed hopper can be hung above the floor inside the animal cage. The laboratory mice are able to insert their needle-like tongues through the screen openings for reaching the feed. However, partition shielding plates subdividing the screen structure prevent the mice from gaining bodily access to the food source and possibly contaminating same by depositing therein bodily excretory wastes. A patent to Mancini U.S. Pat. No. 3,505,977 discloses a rodent feeder assembly for laboratory animals, wherein a trough is provided with a lid having selected opening sizes to provided limited access by the animal to the trough contents for feeding purposes while restricting bodily access thereto thus avoiding food contamination with urine or feces. A published Abstract to Law et al. U.S. application Ser. No. 182,084 shows a laboratory mouse feeder comprising a hopper cover provided with slots to permit the caged rodents to consume the food while preventing bodily entrance of the animal into the hopper thus avoiding possible contamination of the food with animal excretory wastes.

The above prior art laboratory feed devices, particularly those shown by Hunziker, although suitable for smaller size rodents, such as mice, are not fully satisfactory for larger size animals, such as rats. In many cases adult rats were unable to efficaciously reach the feed because either the openings in the screen blocking structures were too small, or in cases where such openings were sufficiently large, the completely attached screened structures prevented the laboratory animals from adequate contact with the food, which was not being continuously fed from the food source, thus leading to distorted research results or discarding of expensively dosed food. The Hoeltge Patent, U.S. Pat. No. 3,114,350 shows a laboratory rat feeder which was not satisfactory for the purposes discussed above because young rats of smaller size were able to gain bodily access to the feed thus contaminating same with bodily excrement. Moreover, the rats were difficult to remove from the feed for weighing purposes. Furthermore, larger rats had difficulties reaching the last portion of food causing either reduced eating, and distored test results, or as mentioned above, uneconomical discarding of the dosed feed.

It has been found that most commercially available rat feeders do not have the capacity to hold 600-700 grams of feed required to maintain three rats for a week. See Nolen, G. A., Alexander, J. C.: Comparison of growth and fat utilization of caesarian derived and conventional albino rats. Laboratory Animal Care, Vol. 15, pp. 295-303, 1965 and Mohn, H. E. and Hopkins, L. L., Jr., An all plastic system for housing small animals in trace element studies, Laboratory Animal Science, Vol. 22, pp. 96-98, 1972. Some feeders, as mentioned above, allow rats to climb inside the feeding area and contaminate the feed as well as block other rats from access to feed. Spillage of feed is often significant through the feed retainer or from rats digging in the food container, which results in erroneous food consumption data. The height and holding brackets of most commercially available feeders do not fit conventional plastic laboratory rat cages causing improper lid closure. Finally, the design of some of the commercial feeders is such that feed which may contain hazardous substances is not readily removed by automatic washing procedures.

On the other hand, the present improved Laboratory Rat Feeder Assembly, as will be more specifically disclosed below, will advantageously overcome these problems of the prior art commercial structures and will more safely and accurately accomplish the medical research purposes discussed above.

SUMMARY OF THE INVENTION

It is an object of the present invention to provide a continuous source of feed which may be dosed with chemical carcinogens or other test chemicals, to laboratory rats.

Another object of the present invention is to prevent undue spillage of the feed so that consumption of cancer-causing or other chemicals may be accurately measured.

Yet another object is to prevent contamination of the feed through feces or urine, which contain microbiological pattrogens or carcinogenic metabolites, which would distort research results.

Still another object of the instant invention is to prevent distortion of research results because of feed waste, either due to spillage or inaccessible feed due to bridging or caking of the feed, which interferes with the free feed flow.

Yet another object is to provide a structure suitable for feeding both weanling and adult rats undergoing testing.

Further objects are to overcome deficiencies in the prior art, such as mentioned above; and to provide an improved laboratory rat feeder.

On furtherance of these and other objects, a principal feature of the instant invention is the provision of vertical rectangular screen openings, which suitably measure 2.3 mm in the horizontal direction and 4.5 mm in the vertical direction, as compared with the 1/16 inch square openings in the screens disclosed in the prior art mouse feeders, such as shown in the Hunziker patents, discussed above. The rats are able to insert their flat-rounded tongues through the vertically elongated rectangular openings in order to reach the food comfortably.

Another principal feature of the present invention is the provision of a "floating screen", which is unattached at the bottom portion of the screen. Thus the bottom part of the screen can be moved by the rat to more readily gain limited access to the feed, thus allowing faster breaking up of any bridged food and enhancing continuous movement of the feed from its source toward the screened blocking structure.

The laboratory rat eats through the screen by inserting his tongue through the enlarged vertical rectangular openings, causing small bridges of food, until the weight of the remaining uneaten feed and the slight movement by the rat of the "floating screen" becomes so great that the bridged food collapses onto the screen. This provides, by reasons of screen design, a substantially continual flow and availability of feed to the laboratory rat.

The bottom unattached section of the screen is substantially horizontal and allows for the collection of feed spillage. A plurality of partitions are provided to prevent the rat from entering the feeder openings and contaminating the feed with urine or feces.

For a better understanding of the invention, a possible embodiment thereof will now be described with reference to the attached drawing, it being understood that the embodiment is intended to be merely exemplary and in no way limitative.

BRIEF DESCRIPTION OF THE DRAWING

FIG. 6 is a graph which shows the weight and growth pattern of adult male rats over a nine week test period; and FIG. 7 is a graph which shows the weight and growth pattern of adult female rats over a nine week test period.

DETAILED DESCRIPTION OF A PREFERRED EMBODIMENT

Figure 1:
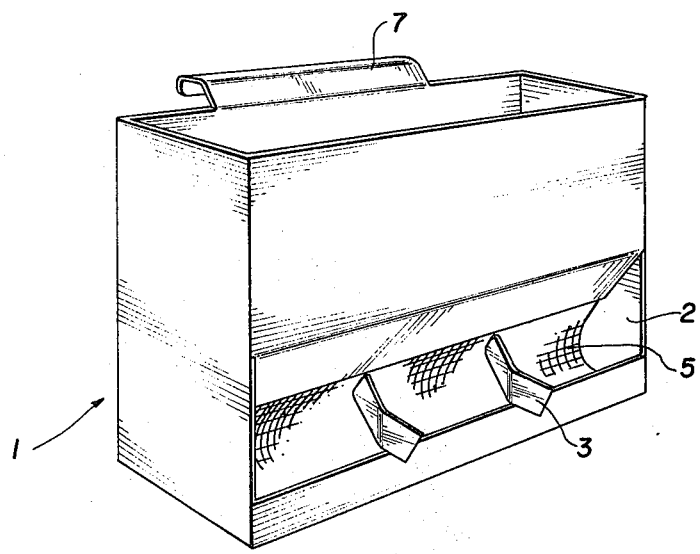
FIG. 1 is a perspective view of a laboratory rat feeder in accordance with the present invention which is designed to hang from the top, inside of an animal cage.
Figure 2:
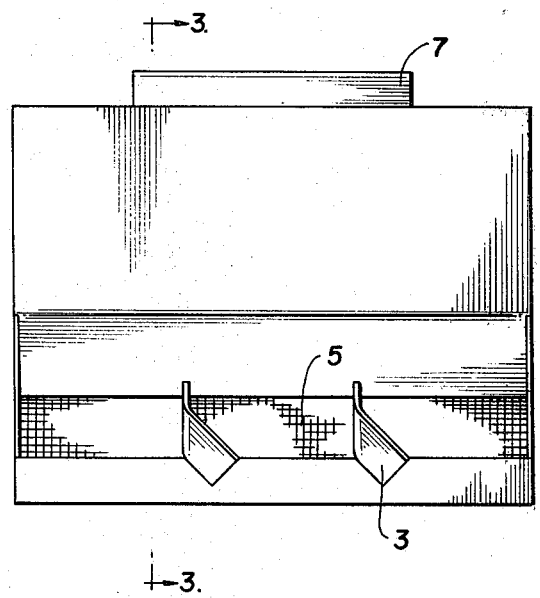
FIG. 2 is a front view of the feeder shown in FIG. 1.
Figure 3:
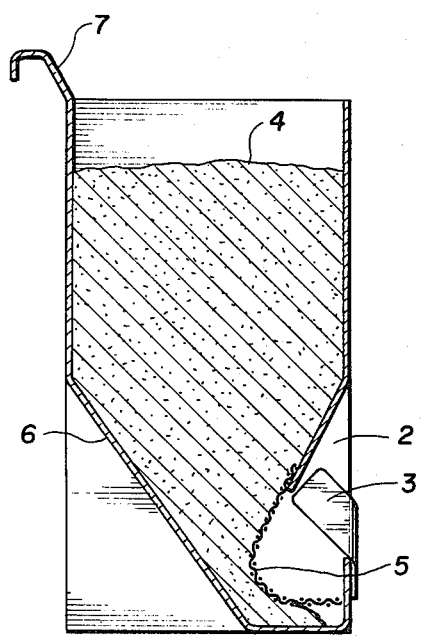
FIG. 3 is a cross-sectional view of the feeder shown in FIG. 2 taken through sectional lines 3—3.

The laboratory rat feeder and feed storage hopper suitably comprises a stainless steel rectangular box 1, about 210 mm in length, 82 mm in width and 160 mm in height, adapted to hang on the inside at the top of the animal cage. In the lower front face of this box is a horizontal rectangular opening 2 covered with a stainless steel wire retainer screen 5 which is sloped from the top of the opening, where it is firmly affixed, downwardly toward the center at a directional angle of approximately 60° with respect to the horizontal plane. The retainer screen is then curved back toward the front face of the box at the bottom of the opening.

The animal feed 4 lies on the top of this retainer screen, the lower edge of which is unattached to allow some flexing and movement of the screen (hereinafter known as a "floating screen") when the rat presses his head against the lower edge thereof, in attempting to reach the feed with his tongue. The flexing of the bottom edge of the screen, resulting in slight movement thereof, will cause small bridges or cakes of the feed to collapse into the face of the screen.

The screen mesh openings are rectangular and measure about 2.3 mm wide horizontally and 4.5 mm in height vertically. The screen supports the feed while preventing it from falling through the screen mesh openings. The rats are able to obtain food through the screen by inserting their tongues through the screen mesh. Such limited access to the feed by the screen prevents loss or spillage of the dosed food by preventing bodily access by the rats and possible digging by the animals in the feed pile.

A lower back panel 6 of the box is sloped about 35° with respect to the vertical plane so that the animal feed is intermittently directed onto the face of the screen, allowing consumption by the rat over the entire supporting area and also to minimize bridging of the food supply. Partitions 3 are located in the feeder opening to prevent the rats from entering the feeding area and possibly contaminating the feed with urine or feces. The top of the feeder box fits flush against the wire bar cover of the cage to prevent the rats from climbing into the top of the feeder box. A flange 7 projects outwardly and downwardly from the top back edge of the bracket. The flange engages with an upper bar of the cage permitting the feed box to hang inside the upper portion of the cage. The feeder box may optionally be constructed of a suitable metal other than stainless steel, or may be fabricated of a suitable plastic material.

The animal feed can be placed directly into the top of the feeder, or a disposable feeder box, designed to fit into the top opening, can be filled and inserted into the feeder. This latter optional procedure permits premeasuring of the feed thus improving the logistics involved in the transportation of test diets for the rats. This is particularly important when studies are conducted in a barrier-type environment.

The stainless steel rectangular feeder box, as described above, hangs from the top inside a plastic shoebox rat cage measuring approximately 19"×10½×8", and leaves adequate floor space for three rats. See Committee on Revision of the Guide of Laboratory Animal Facilities and Care, Institute of Laboratory Animal Resources, National Research Council, "Guide for the Care and Use of Laboratory Animals", National Academy of Science, Washington, D.C., 1978. The rat feeder, as disclosed supra, is capable of holding 600 to 700 grams of meal feed, which is the quantity required to maintain three rats for one week in a diet test.

A rat feeder box as described above, capable of holding up to 700 grams of meal feed, was fabricated and evaluated. Quantitative measurements were made on nutrients, chemical toxicants, etc. when the feeder was used in rat feeding studies, as more specifically described below. The feeder was evaluated in a nine week study, involving 45 weanling rats and 36 adult rats. It provided the rats with a continuous supply of diet which was relatively free from feces and urine contamination. Feed waste, due to spillage and inaccessible feed, was minimal and estimated to average 0.8%. Growth and weight maintenance in weanling and adult rats using the feeder were similar when compared to rats receiving pelleted feed "ad libitum".

The nine-week rat feeding study conducted to evaluate the feeder will be more particularly described at this juncture. Animals used in the experiment were adult Crl: COBS CD (SD) BR Rats, Outbred retired breeders, male and female (6-8 months of age) and weanling Fischer 344 Inbred Rats, male and female, (three weeks of age). These animals provided a wide age and size range for testing. All animals were obtained from the NCTR (National Center for Toxicological Research, Jefferson, Ark.) breeder colony. The rats were housed 3 per cage, randomly distributed and separated according to sex and age and identified by earclip. The adult males and females were divided into six groups of three rats each and the weanlings were divided into six groups of three males and nine groups of three females each. Three groups from each age-sex group were given meal in test feeders or pellets as a control standard. The remaining three groups of weanling females were given meal mixed with 2% corn oil in the test feeder to test the possibility of bridging of meal with oil added. The weanling females, with their smaller size and less strength, were added to ascertain the possibility of their being unable to move the feeder screen and cause the feed to flow.

The meal feed was Purina 5010M and the pellets were Purina 5010C. The study was conducted in a conventional animal room under routine conditions (12 hours of light and 12 hours of dark, room temperature controlled at 72° F.±2°, humidity 50%±10% etc.). Feed and water were provided ad libitum. Approximately 650 grams of fresh feed was supplied at weekly intervals and water, cages and litter were changed biweekly. Cages were observed twice daily for general appearance of animals, feed bridging and feed availability. Cages were carefully examined weekly for presence of feces and urine in feeder and for feed spillage. Reference cages containing bedding and 0, 5, 10, or 15 grams of feed were prepared for comparison to determine the level of feed spillage. These amounts represent 0, 0.8%, 1.5% and 2.3% of the feed supplied each week and observations of similar amounts in cages, which are removed from the study, were recorded as none, light, medium or heavy, respectively. At the end of each week, the remaining feed was dumped out of the feeders, the feeders were inverted and placed in a carrying case with a mesh wire bottom and the carrying cases were processed through a Girton tunnel cage washer for cleaning. The washing cycle consisted of a pre-rinse, a power wash (180° F.), a power rinse (180° F.), a final rinse (200° F.) and a drying cycle (240-250° F.). After washing, the feeders were inspected for residual feed and general washing efficiency. All animals except male weanlings were weighed weekly for a nine-week period. Male weanlings were weighed biweekly to provide sufficient data for a predictive model to estimate asymptotic weights so that these weights could be tested for differences between feed schemes. See Johnson, A. M., Analysis of animal weight gains in chronic toxicity studies, Journal of Toxicology and Environmental Health.

The hypotheses of interest in this study were whether the new NCTR rat feeder could provide access to sufficient feed to promote growth patterns in weanling rats and adult rats that is comparable to rats receiving pellets ad libitum. A repeated measure design over time was chosen for each of the four age-sex groups; note Winer, B. J., Statistical Principles in Experimental Design, McGraw Hill Book Co., 1971. (See Table 1 infra). It was determined that 9 animals per feeding scheme were needed to provide adequate power to detect mean animal weight difference between feeding schemes at the 0.05 significant level. Table 2 (below) contains partitioned sources of variation and their associated degrees of freedom for computation of the F-statistics. Difference in feeding schemes was tested with Error (a), while time and the time* feeding scheme interaction was tested by Error (b).

Figure 4:
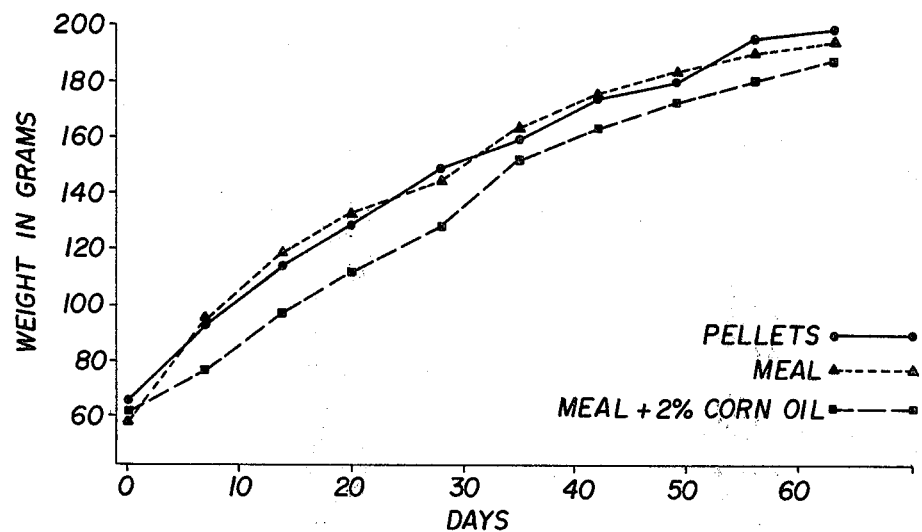
FIG. 4 is a graph which shows the weight and growth pattern of weanling female rats over a nine week test period.

FIG. 4 shows the growth performance of the weanling female rats over the nine-week period. There was a significant difference in the overall weight for the different types of feeding schemes. The growth pattern of these animals for the different feeding schemes was also significantly different; however, these differences can be attributed to animals fed meal +2% corn oil in the test feeder. This reduced growth rate may have been a result of bridging, taste or other factors. It was found that the meal +2% corn oil occasionally did not flow properly and as a result, it was necessary to tap the feeders lightly to dislodge the feed. This only occurred in the feeders with meal +2% corn oil and as the animals grew large enough to move the flexible screen, this occurrence was less frequent.

Figure 5:
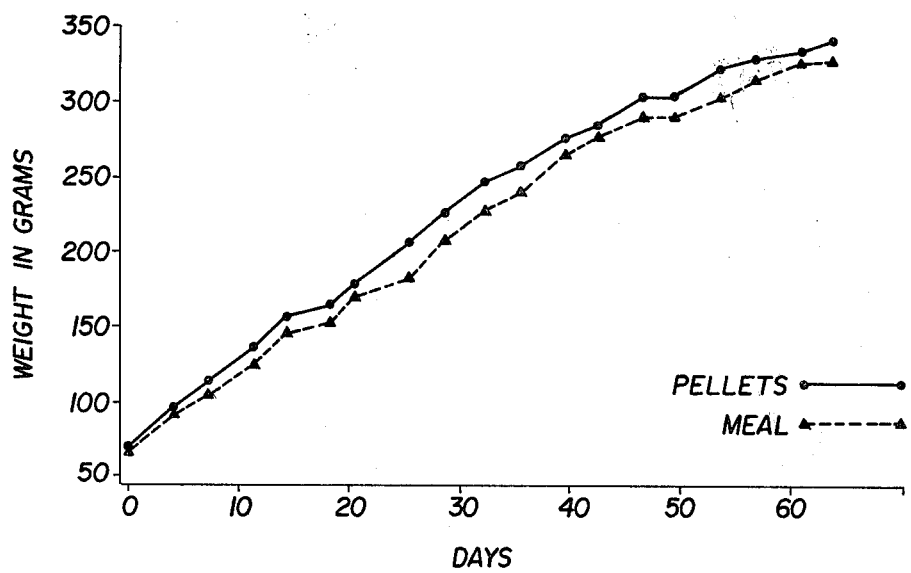
FIG. 5 is a graph which shows the weight and growth pattern of weanling male rats over a nine week test period.

The weights and growth patterns of the male weanling rats are shown in FIG. 5. The overall weights did not differ for those fed pellets or those receiving meal in the new feeder. There appears to be a slight reduced weight gain of the rats on meal after the first week. The estimated asymptotic weight for the male Fischer 344 weanling on pellets was 408.1 grams with 95% confidence limits of 382.5-435.5 grams. The estimated asymptotic weight for those fed meal in the test feeder was 423.9 grams with 95% confidence limit of 377.6-475.9 grams. These estimated asymptotic weights did not differ significantly (i.e., if the animals on pellets and those on meal had been kept on experiment indefinitely, their growth patterns would not have been different).

There was no significant difference in the weight maintenance of either adult males or adult females fed pellets or meal in the new feeders (FIGS. 6 and 7, respectively). There was an obvious error in weighing on day 20 for all groups; however, this did not affect the analysis since the error was consistent for all groups. Six male adult Sprague-Dawley rats were placed on pellets and another six on meal at this time. These animals were weighed for 4 weeks and there was no difference in the weight maintenance for the animals on the two different feeding schemes.

Table 3 (below) shows the average weekly feed consumption (per rat) from the various groups using the new feeder. Although no feed consumption comparisons were made, the data were collected for documentation. One obvious but unexplainable error ws recorded on day 28 in the adult males. The collection of feed consumption data was simple and, with the above exception, seemed relatively accurate. Table 4 (below) shows the weight range and average weight of each group of rats at the beginning and at termination of the study.

TABLE 1

SAMPLE SIZE BY AGE, SEX, AND FEEDING SCHEME

| Age/Sex | Feeding Scheme | | | |
|---|---|---|---|---|
| | Meal | Pellets | Meal + 2% Oil | Total |
| Weanling Fischer Fats | (18) | (18) | (9) | (45) |
| Male | 9 | 9 | 0 | 18 |
| Female | 9 | 9 | 9 | 27 |
| Adult CD Rats | (18) | (18) | (0) | (36) |
| Male | 9 | 9 | 0 | 18 |
| Female | 9 | 9 | 0 | 18 |
| Total Animals | 36 | 36 | 9 | 81 |

TABLE 2

SOURCE OF VARIATION AND DEGREES OF FREEDOM BY AGE AND SEX

| Source of Variation | Degrees of Freedom | | | |
|---|---|---|---|---|
| | Female Weaning | Male Weanling | Female Adult | Male Adult |
| Feeding Scheme | 2 | 1 | 1 | 1 |
| Error (a) | 24 | 16 | 16 | 16 |
| Time | 8 | 17 | 8 | 8 |
| Time* Feeding Scheme | 16 | 17 | 8 | 8 |
| Error (b) | 192 | 272 | 128 | 128 |
| Total | 242 | 323 | 161 | 161 |

TABLE 3

AVERAGE WEEKLY FEED CONSUMPTION (PER RAT) OF RATS USING THE NEW FEEDER

| Day | GROUP | | | | |
|---|---|---|---|---|---|
| | WEANLING MALES | WEANLING FEMALES | (FEED + 2% CORN OIL) WEANLING FEMALES | ADULT MALES | ADULT FEMALES |
| 7 | 86.0 | 74.5 | 42.9 | 147.6 | 97.1 |
| 14 | 106.6 | 87.0 | 64.9 | 127.7 | 114.1 |
| 20 | 85.4 | 71.7 | 52.1 | 193.3 | 60.1 |
| 28 | 124.8 | 84.1 | 77.0 | 459.1* | 146.8 |
| 35 | 114.1 | 89.2 | 87.5 | 127.7 | 131.3 |
| 42 | 174.6 | 90.1 | 66.5 | 177.9 | 121.6 |
| 49 | 126.0 | 91.9 | 72.9 | 155.3 | 112.3 |
| 56 | 144.8 | 80.4 | 70.2 | 163.2 | 114.7 |
| 63 | 126.8 | 74.3 | 72.9 | 167.8 | 113.7 |

*Obvious error

TABLE 4

BODY WEIGHTS AT BEGINNING AND TERMINATION OF EXPERIMENT

| | INITIAL WEIGHTS | | TERMINAL WEIGHTS | |
|---|---|---|---|---|
| | Range | Mean | Range | Mean |
| Adult CD Rats | | | | |
| Females | | | | |
| Pellets | 343.4–457.0 | 371.2 | 317.5–397.6 | 360.7 |
| Meal | 297.0–429.6 | 377.5 | 269.8–424.6 | 362.6 |
| Males | | | | |
| Pellets | 464.5–770.9 | 616.2 | 502.8–767.7 | 657.1 |
| Meal | 534.3–774.7 | 639.1 | 559.4–775.3 | 658.0 |
| Weanling Fischer 344 Rats | | | | |
| Females | | | | |
| Pellets | 50.2–81.0 | 62.5 | 172.1–212.9 | 192.5 |
| Meal | 46.9–72.2 | 60.2 | 172.1–205.4 | 190.3 |
| Meal + Oil | 53.7–75.3 | 64.8 | 175.0–190.6 | 183.1 |
| Males | | | | |
| Pellets | 55.0–84.9 | 71.1 | 327.5–356.5 | 339.3 |
| Meal | 51.3–88.8 | 68.1 | 300.9–356.4 | 326.5 |

An experimental test was conducted by the NCTR Division of Biometry to determine whether providing feed by means of the new rat feeder would promote and maintain the growth of experimental rats as well as the use of standard pellets.

During the experiment, thorough observations and death checks were conducted once per day. To accomplish this the cages were taken from the cage racks and bonnets removed. No further handling or tapping of the cage or feeder was exercised to dislodge feed except that described above with the young females fed meal +2% corn oil. Feed was always available in the feeders containing regular feed meal and the feeders required no tapping. No deaths occurred in any of the groups during the study and general appearance of all animals remained good throughout the study. Only two cases of heavy spillage were observed in cages containing the test feeder. One of the feeders involved was found to have a damaged feed retainer screen which allowed the feed to fall through too freely. Other observations of spillage were evenly distributed between none (42 occurrences), light (54 occurrences) and medium (45 occurrences). Based on these observations, the average spillage rate was estimated to be 0.8%. In no instance was urine observed in the feeder and no case of animals habitating the feeder was observed. A few observations were made of feces in the feeders. This generally occurred in cages with young animals and it was attributed to high levels of activity in cages where feces and bedding were kicked in and was not a result of direct deposit. The residues were usually gone the following day. Inspections of the feeders after washing showed all residual feed has been removed.

The construction of the feeder allowed the animals to reach virtually all of the feed. This could result in considerable reduction of discarded dosed feed, which is very expensive.

The growth promotion portion of the hypothesis was tested by feeding groups of male and female Fischer-344 weanling rats either pellets or meal in the new feeder for a period of nine weeks. One group of females also received meal +2% corn oil in the new feeder as a worse case consideration. The male weanlings were weighed twice weekly to provide sufficient data to use Johnson's weight gain model to estimate asymptotic weights.

There was a significant difference in the overall weight means for the different types of feeding schemes. The growth pattern of the animals for the different feeding schemes was also significantly different. However these differences can be attributed to the animals fed meal +2% corn oil in the new feeders. This can be seen in FIG. 4.

The overall weights of the male weanlings Fischer-344 rats did not differ for those fed pellets or those receiving meal in the new feeders. There appears to be a slight drop in the growth pattern of the rats on meal after the first week, believed to be due mostly to a smaller animal in this group and some suspect weights at 25 and 49 days. See FIG. 5.

The estimated asymptotic weight (estimated weight as time on experiment becomes infinite) for the male Fischer-344 weanlings on pellets was 408.1 grams with 95% confidence limits of 382.5–435.5 grams. The estimated asymptotic weight for those fed meal in the new feeder was 423.9 grams with 95% confidence limits of 377.6–475.9 grams. These estimated asymptotic weights did not differ significantly (i.e., if the animals on pellets and those on meal had been kept on experiment indefinitely their growth patterns would not have been different.)

The weight maintenance portion of the hypothesis was tested using male and female CD rats fed either pellets or meal in the new feeder. There was no significant difference in the weight maintenance of either males or females fed pellets or meal in the new feeder. However, there was an obvious error in weighing on day 20 for all groups (See FIGS. 6 and 7). This did not effect the analysis since the error was consistent for all groups. Six adult Sprague-Dawley rats were placed on pellets and another six on meal at this time. These animals were weighed for 4 weeks and there was no difference in the weight maintenance for the animals on the two different feeding schemes.

Based on the above analysis there appears to be no difference in the growth patterns or weight maintenance of animals fed meal in the new feeder and those eating standard pellets. The exception occurs when 2% corn oil is mixed with the meal. A reduced growth rate occurs which may be a result of bridging, taste or other factors.

Below is a tabulation of the weights, day by day during the testing period, for the various groups of rats.

MEANS BY SEX, AGE, STRAIN, AND TIME

SEX=F   AGE=ADULT   STRAIN=CD

| OBS | OBS_DAY | TRT | WEIGHT  | N | STDEV    | MINIMUM | MAXIMUM | STDERR  | SUM    | VAR     | CV      | RANGE |
|-----|---------|-----|---------|---|----------|---------|---------|---------|--------|---------|---------|-------|
| 1   | 0       | 6   | 371.200 | 9 | 35.7883  | 343.4   | 457.0   | 11.9294 | 3340.8 | 1280.80 | 9.6412  | 113.6 |
| 2   | 0       | 7   | 377.533 | 9 | 39.8588  | 297.0   | 429.6   | 13.2863 | 3397.8 | 1588.73 | 10.5577 | 132.6 |
| 3   | 7       | 6   | 367.367 | 9 | 31.8707  | 312.1   | 418.0   | 10.6236 | 3306.3 | 1015.74 | 8.6754  | 105.9 |
| 4   | 7       | 7   | 362.633 | 9 | 36.1612  | 295.8   | 413.2   | 12.0537 | 3263.7 | 1307.63 | 9.9718  | 117.4 |
| 5   | 14      | 6   | 272.489 | 9 | 55.6437  | 222.1   | 509.5   | 18.5479 | 3352.4 | 3096.23 | 14.9384 | 187.4 |
| 6   | 14      | 7   | 365.800 | 9 | 48.9217  | 285.3   | 455.9   | 16.3072 | 3292.2 | 2353.33 | 13.3725 | 170.6 |
| 7   | 20      | 6   | 331.556 | 9 | 24.9281  | 292.1   | 382.7   | 8.3094  | 2984.0 | 621.41  | 7.5185  | 90.6  |
| 8   | 20      | 7   | 327.711 | 9 | 42.9467  | 236.6   | 387.5   | 14.3156 | 2949.4 | 1844.42 | 13.1050 | 150.9 |
| 9   | 28      | 6   | 354.067 | 9 | 23.1982  | 321.7   | 403.7   | 7.7327  | 3186.6 | 538.15  | 6.5519  | 82.0  |
| 10  | 28      | 7   | 359.444 | 9 | 40.2044  | 287.4   | 424.7   | 13.4015 | 3235.0 | 1616.40 | 11.1852 | 137.3 |
| 11  | 35      | 6   | 355.989 | 9 | 23.8185  | 319.9   | 394.3   | 7.9395  | 3203.9 | 567.32  | 6.6908  | 74.4  |
| 12  | 35      | 7   | 361.356 | 9 | 42.5845  | 277.8   | 426.3   | 14.1950 | 3252.2 | 1813.48 | 11.7848 | 148.5 |
| 13  | 42      | 6   | 356.767 | 9 | 24.4982  | 315.9   | 391.9   | 8.1661  | 3210.9 | 600.16  | 6.8667  | 76.0  |
| 14  | 42      | 7   | 362.700 | 9 | 43.8838  | 281.2   | 432.6   | 14.6279 | 3264.3 | 1925.79 | 12.0992 | 151.4 |
| 15  | 49      | 6   | 359.789 | 9 | 25.0615  | 321.3   | 393.2   | 8.3538  | 3238.1 | 628.08  | 6.9656  | 71.9  |
| 16  | 49      | 7   | 361.344 | 9 | 43.4188  | 274.3   | 420.4   | 14.4729 | 3252.1 | 1885.20 | 12.0159 | 146.1 |
| 17  | 56      | 6   | 357.967 | 9 | 26.4145  | 312.8   | 386.4   | 8.8048  | 3221.7 | 697.73  | 7.3790  | 73.6  |
| 18  | 56      | 7   | 365.356 | 9 | 44.4743  | 272.5   | 424.2   | 14.8248 | 3288.2 | 1977.96 | 12.1729 | 151.7 |
| 19  | 63      | 6   | 360.667 | 9 | 28.1689  | 317.5   | 397.6   | 9.3896  | 3246.0 | 793.49  | 7.8102  | 80.1  |
| 20  | 63      | 7   | 362.633 | 9 | 45.4589  | 269.8   | 424.6   | 15.1530 | 3263.7 | 2066.51 | 12.5358 | 154.8 |

SEX=F   AGE=WEANLING   STRAIN=FISHER-344

| OBS | OBS_DAY | TRT | WEIGHT  | N | STDEV   | MINIMUM | MAXIMUM | STDERR  | SUM    | VAR     | CV      | RANGE |
|-----|---------|-----|---------|---|---------|---------|---------|---------|--------|---------|---------|-------|
| 21  | 0       | 1   | 62.511  | 9 | 10.4356 | 50.2    | 81.0    | 3.47852 | 562.6  | 108.901 | 16.6939 | 30.8  |
| 22  | 0       | 2   | 60.178  | 9 | 9.6014  | 46.9    | 72.2    | 3.20047 | 541.6  | 92.187  | 15.9551 | 25.3  |
| 23  | 0       | 3   | 64.678  | 9 | 7.0130  | 53.7    | 75.3    | 2.33766 | 582.1  | 49.182  | 10.8430 | 21.6  |
| 24  | 7       | 1   | 92.222  | 9 | 10.9461 | 77.7    | 107.9   | 3.64870 | 830.0  | 119.817 | 11.8653 | 30.2  |
| 25  | 7       | 2   | 91.744  | 9 | 9.9660  | 77.5    | 104.8   | 3.32199 | 825.7  | 99.320  | 10.8627 | 27.3  |
| 26  | 7       | 3   | 75.378  | 9 | 11.6192 | 60.7    | 99.1    | 3.87308 | 678.4  | 135.007 | 15.4147 | 38.4  |
| 27  | 14      | 1   | 114.667 | 9 | 10.6621 | 100.6   | 127.7   | 3.55403 | 1032.0 | 113.680 | 9.2983  | 27.1  |
| 28  | 14      | 2   | 115.733 | 9 | 10.8190 | 101.6   | 130.3   | 3.60632 | 1041.6 | 117.050 | 9.3482  | 28.7  |
| 29  | 14      | 3   | 96.333  | 9 | 8.5566  | 82.2    | 107.9   | 2.85219 | 867.0  | 73.215  | 8.8823  | 25.7  |
| 30  | 20      | 1   | 125.167 | 9 | 8.9652  | 109.9   | 139.6   | 2.98840 | 1126.5 | 80.375  | 7.1626  | 29.7  |
| 31  | 20      | 2   | 130.078 | 9 | 9.4016  | 116.3   | 140.8   | 3.13386 | 1170.7 | 88.389  | 7.2276  | 24.5  |
| 32  | 20      | 3   | 109.656 | 9 | 7.2255  | 95.9    | 119.2   | 2.40850 | 986.9  | 52.208  | 6.5893  | 23.3  |
| 33  | 28      | 1   | 145.133 | 9 | 9.0197  | 132.6   | 161.6   | 3.00657 | 1306.2 | 81.355  | 6.2148  | 29.0  |
| 34  | 28      | 2   | 144.800 | 9 | 11.6959 | 130.5   | 162.2   | 3.89865 | 1303.2 | 136.795 | 8.0773  | 31.7  |
| 35  | 28      | 3   | 126.656 | 9 | 6.1293  | 117.7   | 134.4   | 2.04309 | 1139.9 | 37.568  | 4.8393  | 16.7  |
| 36  | 35      | 1   | 158.144 | 9 | 9.3771  | 142.9   | 169.5   | 3.12570 | 1423.3 | 87.930  | 5.9295  | 26.6  |
| 37  | 35      | 2   | 158.589 | 9 | 10.9369 | 143.5   | 176.5   | 3.64556 | 1427.3 | 119.611 | 6.8963  | 33.0  |
| 38  | 35      | 3   | 150.289 | 9 | 7.6609  | 140.7   | 161.5   | 2.55351 | 1352.6 | 58.684  | 5.0972  | 20.8  |
| 39  | 42      | 1   | 168.411 | 9 | 11.3576 | 153.5   | 181.6   | 3.78588 | 1515.7 | 128.996 | 6.7440  | 28.1  |
| 40  | 42      | 2   | 169.922 | 9 | 11.0709 | 153.4   | 186.8   | 3.69018 | 1529.3 | 122.557 | 6.5151  | 33.4  |

SEX=F    AGE=WEANLING    STRAIN=FISHER-344    -continued

| OBS | OBS_DAY | TRT | WEIGHT | N | STDEV | MINIMUM | MAXIMUM | STDERR | SUM | VAR | CV | RANGE |
|---|---|---|---|---|---|---|---|---|---|---|---|---|
| 41 | 42 | 3 | 159.622 | 9 | 6.8421 | 150.2 | 168.3 | 2.28070 | 1436.6 | 46.814 | 4.2864 | 18.1 |
| 42 | 49 | 1 | 177.389 | 9 | 11.0146 | 161.9 | 192.9 | 3.67153 | 1596.5 | 121.321 | 6.2093 | 31.0 |
| 43 | 49 | 2 | 178.956 | 9 | 9.3784 | 167.0 | 194.6 | 3.12615 | 1610.6 | 87.955 | 5.2407 | 27.6 |
| 44 | 49 | 3 | 169.289 | 9 | 7.4065 | 160.9 | 185.0 | 2.46951 | 1523.6 | 54.886 | 4.3763 | 24.1 |
| 45 | 56 | 1 | 189.300 | 9 | 16.4858 | 162.7 | 208.7 | 5.49528 | 1703.7 | 271.783 | 8.7088 | 46.0 |
| 46 | 56 | 2 | 187.422 | 9 | 7.9993 | 177.4 | 202.4 | 2.66645 | 1686.8 | 63.989 | 4.2681 | 25.0 |
| 47 | 56 | 3 | 176.211 | 9 | 4.6391 | 171.2 | 184.0 | 1.54636 | 1586.8 | 21.521 | 2.6312 | 12.8 |
| 48 | 63 | 1 | 192.500 | 9 | 14.3373 | 172.1 | 212.9 | 4.77909 | 1732.5 | 205.558 | 7.4479 | 40.8 |

MEANS BY SEX, AGE, STRAIN, AND TIME

SEX=F    AGE=WEANLING    STRAIN=FISHER-344

| OBS | OBS_DAY | TRT | WEIGHT | N | STDEV | MINIMUM | MAXIMUM | STDERR | SUM | VAR | CV | RANGE |
|---|---|---|---|---|---|---|---|---|---|---|---|---|
| 49 | 63 | 2 | 190.311 | 9 | 7.0243 | 183.3 | 205.4 | 2.34144 | 1712.8 | 49.3411 | 3.69097 | 22.1 |
| 50 | 63 | 3 | 183.144 | 9 | 4.53324 | 175.0 | 190.6 | 1.51108 | 1648.3 | 20.5503 | 2.47523 | 15.6 |

SEX=M    AGE=ADULT    STRAIN=CD

| OBS | OBS_DAY | TRT | WEIGHT | N | STDEV | MINIMUM | MAXIMUM | STDERR | SUM | VAR | CV | RANGE |
|---|---|---|---|---|---|---|---|---|---|---|---|---|
| 51 | 0 | 8 | 616.222 | 9 | 108.909 | 464.5 | 770.9 | 36.3031 | 5546.0 | 11861.3 | 17.6737 | 306.4 |
| 52 | 0 | 9 | 639.143 | 7 | 95.082 | 534.3 | 774.7 | 35.9376 | 4474.0 | 9040.6 | 14.8765 | 240.4 |
| 53 | 7 | 8 | 634.622 | 9 | 99.225 | 484.0 | 752.4 | 33.1085 | 5711.6 | 9845.5 | 15.6511 | 268.4 |
| 54 | 7 | 9 | 651.511 | 9 | 83.245 | 546.1 | 770.0 | 27.7485 | 5863.6 | 6929.8 | 12.7773 | 223.9 |
| 55 | 14 | 8 | 639.411 | 9 | 100.326 | 488.6 | 760.7 | 33.4420 | 5754.7 | 10065.3 | 15.6904 | 272.1 |
| 56 | 14 | 9 | 644.611 | 9 | 84.389 | 547.2 | 778.1 | 28.1297 | 5801.5 | 7121.5 | 13.0915 | 230.9 |
| 57 | 20 | 8 | 576.433 | 9 | 96.999 | 429.0 | 693.2 | 32.3329 | 5187.9 | 9408.8 | 16.8274 | 264.2 |
| 58 | 20 | 9 | 586.067 | 9 | 87.807 | 447.6 | 712.4 | 29.2691 | 5274.6 | 7710.1 | 14.9825 | 264.8 |
| 59 | 28 | 8 | 625.500 | 9 | 99.277 | 471.1 | 752.5 | 33.0922 | 5629.5 | 9855.9 | 15.8716 | 281.4 |
| 60 | 28 | 9 | 628.756 | 9 | 78.737 | 528.4 | 769.2 | 26.2455 | 5658.8 | 6199.5 | 12.5226 | 240.8 |
| 61 | 35 | 8 | 634.600 | 9 | 96.767 | 488.1 | 752.6 | 32.2557 | 5711.4 | 9363.9 | 15.2485 | 264.5 |
| 62 | 35 | 9 | 642.011 | 9 | 78.463 | 538.5 | 776.9 | 26.1544 | 5778.1 | 6156.5 | 12.2215 | 238.4 |
| 63 | 42 | 8 | 643.244 | 9 | 102.067 | 491.0 | 757.4 | 34.0223 | 5789.2 | 10417.6 | 15.8675 | 266.4 |
| 64 | 42 | 9 | 655.356 | 9 | 82.760 | 551.0 | 786.9 | 27.5867 | 5898.2 | 6849.2 | 12.6283 | 235.9 |
| 65 | 49 | 8 | 658.056 | 9 | 107.245 | 493.2 | 785.3 | 35.7483 | 5922.5 | 11501.5 | 16.2972 | 292.1 |
| 66 | 49 | 9 | 652.733 | 9 | 79.583 | 556.9 | 779.3 | 26.5278 | 5874.6 | 6333.5 | 12.1923 | 222.4 |
| 67 | 56 | 8 | 643.122 | 9 | 111.770 | 494.0 | 776.0 | 37.2568 | 5788.1 | 12492.6 | 17.3793 | 282.0 |
| 68 | 56 | 9 | 656.578 | 9 | 81.415 | 561.0 | 780.5 | 27.1384 | 5912.8 | 6628.4 | 12.3924 | 219.5 |
| 69 | 63 | 8 | 657.067 | 9 | 105.351 | 502.8 | 767.7 | 35.1171 | 5913.6 | 11098.9 | 16.0336 | 264.9 |
| 70 | 63 | 9 | 658.011 | 9 | 81.238 | 559.4 | 775.3 | 27.0795 | 5922.1 | 6599.7 | 12.3460 | 215.9 |

SEX=M    AGE=WEANLING    STRAIN=FISHER-344

| OBS | OBS_DAY | TRT | WEIGHT | N | STDEV | MINIMUM | MAXIMUM | STDERR | SUM | VAR | CV | RANGE |
|---|---|---|---|---|---|---|---|---|---|---|---|---|
| 71 | 0 | 4 | 71.122 | 9 | 11.3447 | 55.0 | 84.9 | 3.7816 | 640.1 | 128.70 | 15.9510 | 29.9 |
| 72 | 0 | 5 | 68.111 | 9 | 12.9954 | 51.3 | 88.8 | 4.3318 | 613.0 | 168.88 | 19.0797 | 37.5 |
| 73 | 4 | 4 | 96.389 | 9 | 14.2696 | 73.7 | 112.0 | 4.7565 | 867.5 | 203.62 | 14.8042 | 38.3 |
| 74 | 4 | 5 | 91.456 | 9 | 14.8201 | 74.5 | 117.3 | 4.9400 | 823.1 | 219.64 | 16.2047 | 42.8 |
| 75 | 7 | 4 | 111.856 | 9 | 13.2431 | 92.3 | 128.5 | 4.4144 | 1006.7 | 175.38 | 11.8395 | 36.2 |
| 76 | 7 | 5 | 108.078 | 9 | 15.1391 | 90.8 | 134.2 | 5.0464 | 972.7 | 229.19 | 14.0016 | 43.4 |
| 77 | 11 | 4 | 132.644 | 9 | 13.3327 | 111.0 | 150.1 | 4.4442 | 1193.8 | 177.76 | 10.0514 | 39.1 |
| 78 | 11 | 5 | 127.500 | 9 | 16.3192 | 100.6 | 154.9 | 5.4397 | 1147.5 | 266.32 | 12.7994 | 54.3 |
| 79 | 14 | 4 | 149.522 | 9 | 13.1010 | 127.3 | 167.6 | 4.3670 | 1345.7 | 171.64 | 8.7619 | 40.3 |
| 80 | 14 | 5 | 144.311 | 9 | 16.4762 | 118.9 | 173.5 | 5.4921 | 1298.8 | 271.47 | 11.4172 | 54.6 |
| 81 | 18 | 4 | 162.778 | 9 | 14.9427 | 132.9 | 177.4 | 4.9809 | 1465.0 | 223.28 | 9.1758 | 44.5 |
| 82 | 18 | 5 | 152.522 | 9 | 24.2492 | 123.2 | 195.7 | 8.0831 | 1372.7 | 588.02 | 15.8988 | 72.5 |
| 83 | 20 | 4 | 176.911 | 9 | 14.9685 | 148.5 | 194.2 | 4.9895 | 1592.2 | 224.06 | 8.4610 | 45.7 |
| 84 | 20 | 5 | 169.522 | 9 | 21.0880 | 146.8 | 209.0 | 7.0293 | 1525.7 | 444.70 | 12.4356 | 62.2 |
| 85 | 25 | 4 | 205.200 | 9 | 15.1780 | 178.1 | 223.7 | 5.0593 | 1846.8 | 230.37 | 7.3967 | 45.6 |
| 86 | 25 | 5 | 184.056 | 9 | 37.9450 | 133.4 | 237.9 | 12.6483 | 1656.5 | 1439.82 | 20.6161 | 104.5 |
| 87 | 28 | 4 | 226.222 | 9 | 12.5715 | 205.8 | 245.4 | 4.1905 | 2036.0 | 158.04 | 5.5571 | 39.6 |
| 88 | 28 | 5 | 205.689 | 9 | 28.8322 | 168.8 | 247.8 | 9.6108 | 1851.2 | 831.30 | 14.0174 | 79.0 |
| 89 | 32 | 4 | 246.622 | 9 | 9.9972 | 228.6 | 261.5 | 3.3324 | 2219.6 | 99.94 | 4.0537 | 32.9 |
| 90 | 32 | 5 | 223.844 | 9 | 33.2829 | 176.9 | 268.2 | 11.0943 | 2014.6 | 1107.75 | 14.8688 | 91.3 |

MEANS BY SEX, AGE, STRAIN, AND TIME

SEX=M   AGE=WEANLING   STRAIN=FISHER-344

| OBS | OBS_DAY | TRT | WEIGHT | N | STDEV | MINIMUM | MAXIMUM | STDERR | SUM | VAR | CV | RANGE |
|---|---|---|---|---|---|---|---|---|---|---|---|---|
| 91 | 35 | 4 | 253.633 | 5 | 10.2062 | 235.3 | 266.7 | 3.40274 | 2282.7 | 104.208 | 4.0248 | 27.4 |
| 92 | 35 | 5 | 237.378 | 9 | 28.5253 | 191.3 | 275.3 | 9.50843 | 2136.4 | 813.692 | 12.0168 | 84.0 |
| 93 | 39 | 4 | 274.569 | 9 | 8.6418 | 259.9 | 288.3 | 2.88061 | 2471.2 | 74.681 | 3.1472 | 28.4 |
| 94 | 39 | 5 | 260.156 | 9 | 25.0566 | 229.9 | 295.0 | 8.35220 | 2341.4 | 627.833 | 9.6314 | 65.1 |
| 95 | 42 | 4 | 283.289 | 9 | 10.3729 | 266.8 | 301.3 | 3.45762 | 2549.6 | 107.596 | 3.6616 | 34.5 |
| 96 | 42 | 5 | 271.889 | 5 | 23.7542 | 243.9 | 303.8 | 7.91806 | 2447.0 | 564.261 | 8.7367 | 59.9 |
| 97 | 46 | 4 | 257.600 | 9 | 8.568C | 284.5 | 315.5 | 2.85599 | 2678.4 | 73.410 | 2.8750 | 31.0 |
| 98 | 46 | 5 | 285.400 | 5 | 22.7153 | 259.9 | 316.5 | 7.57177 | 2568.6 | 515.985 | 7.9551 | 56.6 |
| 99 | 49 | 4 | 300.033 | 9 | 14.3442 | 266.4 | 320.0 | 4.78142 | 2700.3 | 205.757 | 4.7809 | 53.6 |
| 100 | 49 | 5 | 287.111 | 9 | 23.8492 | 250.1 | 321.8 | 7.94973 | 2584.0 | 568.784 | 8.3066 | 71.7 |
| 101 | 53 | 4 | 316.367 | 5 | 8.820C | 306.0 | 336.8 | 2.94000 | 2865.3 | 77.792 | 2.7704 | 30.8 |
| 102 | 53 | 5 | 302.222 | 9 | 20.8907 | 272.5 | 334.0 | 6.96355 | 2720.0 | 436.415 | 6.9123 | 61.1 |
| 103 | 56 | 4 | 327.078 | 9 | 8.2322 | 317.3 | 345.0 | 2.74407 | 2943.7 | 67.769 | 2.5169 | 27.7 |
| 104 | 56 | 5 | 311.189 | 9 | 20.4552 | 260.5 | 339.2 | 6.81573 | 2800.7 | 418.579 | 6.5745 | 58.7 |
| 105 | 60 | 4 | 333.056 | 9 | 8.3172 | 324.6 | 349.7 | 2.77239 | 2997.5 | 69.175 | 2.4972 | 25.1 |
| 106 | 60 | 5 | 322.522 | 9 | 20.0285 | 295.9 | 351.3 | 6.67616 | 2906.3 | 401.139 | 6.2023 | 55.4 |
| 107 | 63 | 4 | 335.333 | 9 | 8.1904 | 327.5 | 356.5 | 2.73013 | 3054.0 | 67.082 | 2.4137 | 29.0 |
| 108 | 63 | 5 | 326.489 | 9 | 20.0922 | 300.5 | 356.4 | 6.69740 | 2938.4 | 403.696 | 6.1540 | 55.5 |

Based on the above evaluation, there are no differences in the growth patterns or weight maintenance of animals fed standard meal in the new feeder and those eating standard pellets. The feeder passed all of the tests and is satisfactory for use in experiments such as nutritional and toxicological studies, particularly where feed, toxicant, or nutrient consumption data are desired.

It is within the scope of this disclosure to use other means to hang the feeder box above the floor of the rat cage to conserve floor space therein. For example, an L-shaped plate, forming a U-shaped channel with a side wall of the feeder, could be used for interlocking with the upper portion of a wall of the animal cage. For this purpose, it should be noted that any suitable mounting means, such as hooks, may be employed. Furthermore, the L-shaped plate could be made movable with respect to a side wall of the feeder through the use of a hinge means.

In operation, an autoclavable powdered mash feed is placed into the feeder via its open top and is allowed to funnel down to the lower portion of the feeder so that a pile of feed rests on the top portion of the wire mesh screen. The feeder is weighed and then placed in the laboratory animal cage. As the rat eats the food, by moving its tongue over the screen, or by slightly pushing the unattached lower edge of the screen (previously denominated as a "floating screen"), the weight of the remaining feed becomes so great that the eaten food is replaced due to gravitational downward flow of an equal quantity of the feed stored in the feed chamber above the screen. Rats, which normally weight 50–1000 gm, can easily move the flexible unattached "floating screen"; however, mice are normally too small and light, weighing 10–40 gm, to advantageously move the screen. Thus the screen design is particularly adapted for laboratory rat feeder constructions. It is thus clear that the improved rat feeder, described in the instant specification, presents the feed to the rats in a relatively large area while insuring a substantially continual flow and availability of the feed to the caged laboratory animals as the feed pile collapses onto the screen surface. At the end of a feeding cycle (usually one week) the feeder is reweighed and the remaining feed is discarded. The feeder is washed, sterilized and returned for reuse in the laboratory.

The inherent advantage of the above-described laboratory rat feeder lies in the fact that an accurate determination can be made of the quantity of feed, which has been consumed. This permits calculation of the dose of a chemical fed to an animal in the food. The non-contamination of the food is also important because research results can be influenced greatly by the repeated ingestion of a test chemical and/or its metabolites. Because the laboratory rat is unable to get more than its head over the screen portion of the feeder, it cannot defecate or urinate into that feed. Furthermore, any food particles which drop from the animal's mouth will be collected as spillage within the feeder below the lower screen portion, and can be weighed together with the remainder of the uneaten feed.

The foregoing description of preferred specific embodiments will so fully reveal the general nature of the invention that others can, by applying current knowledge, readily modify such specific embodiments and/or adapt them for various applications without departing from the generic concept; therefore such adaptations and modifications should and are comprehended within the meaning and range of equivalents of the disclosed embodiments of the disclosed embodiments. Further, it is to be understood that the phraseology and terminology employed herein is for the purpose of description and not of limitation.

It will be obvious to those skilled in the art that various changes may be made without departing from the scope of the invention and therefore the invention is not to be limited to what is shown in the drawing and described in the specification.

What is claimed is:

1. A feeding device for laboratory rats comprising a feed storage hopper including wall means defining a chamber, closed at its bottom, which chamber holds a quantity of animal feed, said chamber having an upper portion, a lower portion, a feed inlet means at its upper portion and a feeding opening in the lower front face of the chamber above the closed bottom, a back panel sloped at an angle of about 35° with respect to its vertical plane, generally U-shaped feeding means mounted in the feeding opening in the lower portion of said chamber for allowing restricted contact of the feed by the rat, said feeding means comprising a "floating" screen firmly affixed at its upper end to said upper portion and covering said feeding opening, provided with rectangular openings, sloped from the top of said feeding opening toward the center and downwardly at an inclined angle of about 60° with respect to its horizontal plane sufficient so that the weight of the feed thereabove forces a continual collapsing thereof downwardly along said sloping back panel as the feed is consumed from below, the lower portion of the screen extending horizontally and being unattached at the end thereof to allow slight movement and flexing thereof by the rat permitting faster breaking up of any caked food, thus allowing the rat to ingest the feed resting on the upper screen portion, the mesh size of the screen openings being sufficient to support powdered mash feed without falling through the openings while permitting the rat to insert his tongue through the openings for feeding purposes, and partitioning means connected to said feeding means for preventing the rats from bodily entry to the feeder thus precluding possible contamination of the feed through feces or urine.

2. The feeding device of claim 1, further comprising mounting means attached to the upper back portion of said wall means for mounting the feed storage hopper on a rat cage.

3. The feeding device of claims 1 or 2 wherein said feeding means is a wire mesh screen provided with rectangular openings which are longer in the vertical direction.

4. The feeding device of claim 3, wherein the rectangular openings of the screen measure 2.3 mm×4.5 mm.

5. The feeding device of claim 3 wherein said upper and lower screen portions constitute a unitary screen bent to a generally U-shaped configuration.

6. In a feeding device for laboratory animals, comprising:

wall means defining a chamber closed at its bottom holding a quantity of animal feed, said chamber having an upper portion, a lower portion, a feed inlet means at its upper portion and a feeding opening in its lower portion above the closed bottom;

a generally V-shaped feeding means mounted in the feeding opening in the lower portion for allowing laboratory animals to feed, said feeding means comprising upper and lower screen sections which project inwardly toward the center of said chamber and meet in the apex of the V, said upper screen section being affixed in said feed opening at an inclined angle sufficient so that the weight of the feed thereabove forces a continual collapsing downwardly of the feed as it is consumed from below, said lower screen section being integral with said upper screen section at the apex of the V and extending horizontally in said opening below said upper screen section and above said closed bottom, wherein a laboratory animal can ingest the feed resting on said upper screen, said upper and lower screen having a mesh size sufficient to support powdered mash feed without going through its openings while allowing a laboratory animal to feed therethrough; and partition means connected to said feeding means for preventing the laboratory animals from entering said feeder means thereby precluding contamination of the feed through feces or urine;

the improvement comprising:

(1) the apex of said V being rounded to provide a U-shaped configuration;

(2) said lower screen section being unaffixed at its end opposite said U-shaped portion, said upper and lower screen sections thereby constituting means to allow slight movement and flexing thereof when a laboratory rat ingests the feed resting on the upper screen section;

(3) said inclined angle of said upper screen section being about 60° with respect to the horizontal, said feeding device further comprising a back panel sloped inwardly and downwardly at an angle from the vertical of about 35°, and located opposite said upper screen section to define therebetween a feed holding volume which becomes progressively and rapidly thinner from the front to the back of said feeding device from the top of said back panel to said U-shaped portion of said screen; and (4) the mesh of said upper and lower screen sections constituting rectangular openings which are longer in the vertical direction in said upper screen section, thereby constituting means for permitting a laboratory rat to insert its tongue sideways through said openings for feeding purposes.

7. A feeding device for laboratory rats according to claim 6, wherein said rectangular openings measure approximately 2.3 mm×4.5 mm and wherein said upper and lower screen sections constitute a unitary screen bent to form said generally U-shaped configuration.

* * * * *